Sept. 30, 1958 J. L. NISBET 2,853,844
APPARATUS FOR HARVESTING GRASS SEED
Original Filed Feb. 5, 1951 2 Sheets-Sheet 1

INVENTOR.
John L. Nisbet

ATTORNEY

Sept. 30, 1958 J. L. NISBET 2,853,844
APPARATUS FOR HARVESTING GRASS SEED
Original Filed Feb. 5, 1951 2 Sheets-Sheet 2
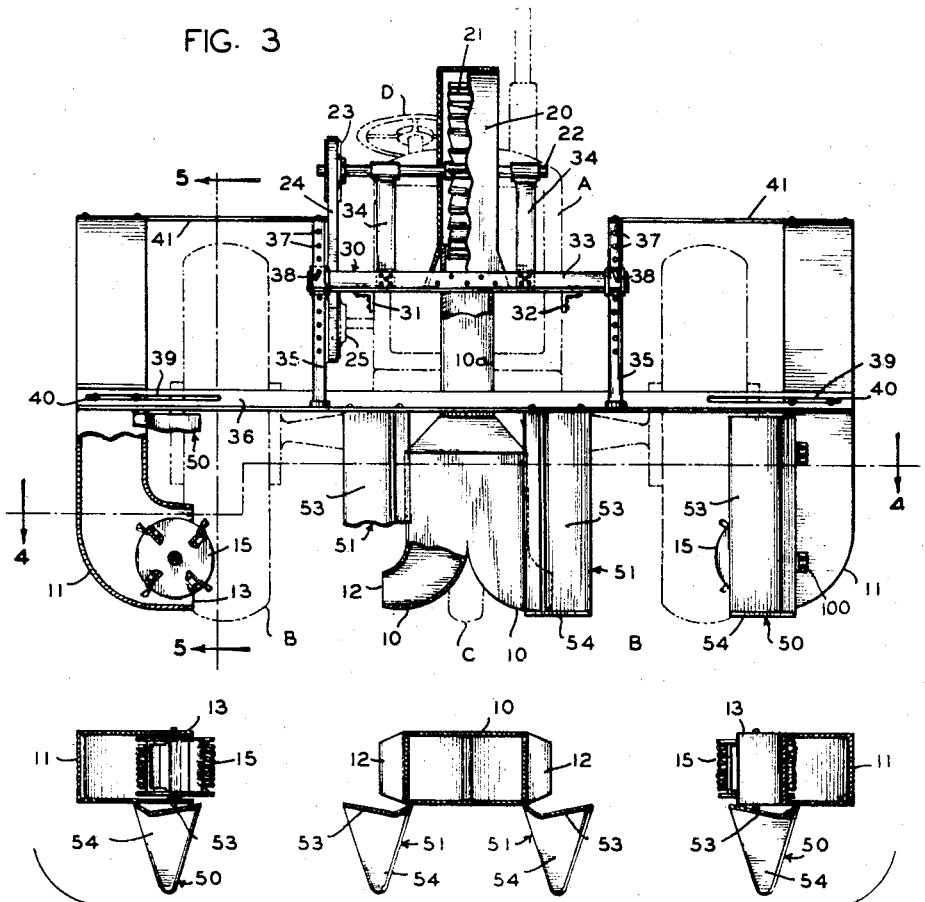
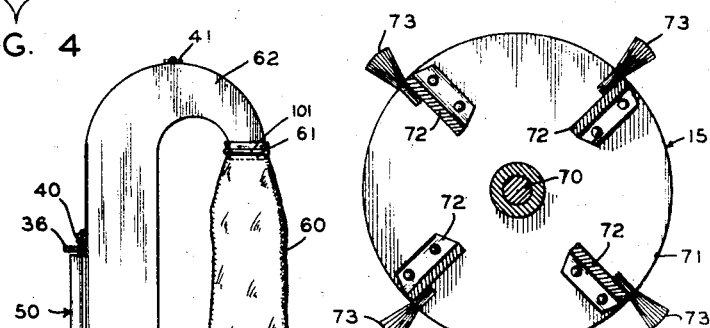
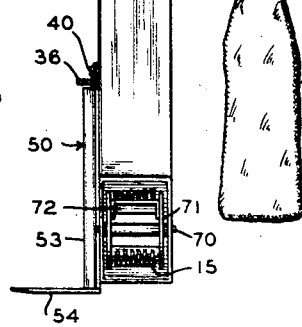
INVENTOR.
John L. Nisbet
ATTORNEY

United States Patent Office 2,853,844
Patented Sept. 30, 1958

2,853,844

APPARATUS FOR HARVESTING GRASS SEED

John L. Nisbet, El Paso, Tex.

Original application February 5, 1951, Serial No. 209,391, now Patent No. 2,706,373, dated April 19, 1955. Divided and this application March 11, 1955, Serial No. 493,775

8 Claims. (Cl. 56—126)

The invention relates to improved apparatus for harvesting ripe grass seed in the field. The present application is a division of my application Serial No. 209,391, filed February 5, 1951, relating to Method of Harvesting Grass Seeed, now Patent No. 2,706,373, dated April 19, 1955.

There are at present a number of excellent grasses which are extremely valuable for planting in new territory and in the reseeding of more or less barren territories, many of which are found in the Southwest and elsewhere in the United States. Due to the peculiarities of a number of these grasses there has not been any effective means for threshing or harvesting the same. Existing combines or regular grain threshers do only a meager job even if a considerable amount of time and effort have been expended for setting the machine for the particular job. One of the valuable grasses which cannot be effectively threshed with present machinery is the Blue Stem Grass, known as "King Ranch Blue Stem." The seed of such grass in condition for planting currently sells for about $50.00 per pound. Such grass has a head about two and one-half inches long. The first blooms are at the top of the head and accordingly ripening occurs first at the tip of the head, and by the time the lower part of the head is ripe and ready for harvesting the seed which has matured at the top portion of the head has been shattered and lost unless harvested prior to the ripening of the seed at the lower part of the head. If the harvesting of seed at the upper portion of the head is carried out with equipment at present available the green or immature lower portion of the head is injured by the swiftly revolving positively driven spiked toothed picking members which are generally employed in the threshing operation.

The primary object of the present invention is accordingly to provide means for selectively harvesting the ripe grass seed only, without injuring any unripened or green portions of the head, and without injury to the grass itself. By repeatedly subjecting the seed bearing heads of grass to my improved threshing operation a much larger proportion of the seed is saved than has been possible heretofore. In accordance with my invention I rely principally upon the use of a powerful air blast to blow the ripe seeds out of the heads as the apparatus is passed through a field of grass to be harvested, this grass seed being blown into and through a receiving conduit and thence into a bag or other suitable receptacle which is preferably porous to allow air to pass therethrough while retaining the grass seed. Preferably, a revolving brush or the like driven solely by the air blast assists and coacts with the air blast in removing the ripe seed from the grass heads. A brush so rotated imparts only a light touch to the heads containing the seed. The air blast in combination with the brush revolved thereby perform a very selective harvesting operation in that the ripe seed is removed and blown into the receptacle while the green portion of the head is in no way injured or molested, leaving unripe seed to mature for later harvesting. Thus, my improved apparatus is particularly designed for the express purpose of harvesting grass seed in the field without injury to the green portion of the grass, and is not to be confused with other types of apparatus relying on positively driven toothed cylinders and the like for performing the threshing operation, which power devices, while designed for harvesting grains such as wheat, rye, oats, barley and the like, are not suitable for harvesting grass seed, particularly Blue Stem Grass or the like.

In accordance with the preferred embodiment of my invention the threshing equipment, including a blower conduit and a receiving conduit containing a brush or the like adapted to be rotated solely by the force of the air blast, are carried at the front of the tractor. The revolving brush is mounted with its axis parallel to the line of travel of the tractor and the air blast is directed substantially at right angles to the line of travel toward the lower portion of the brush. My improved apparatus, which is particularly adapted to thresh grain planted in rows, may also be effectively used to handle broadcast crops, and may be provided with multiple sets of blowing and receiving conduits in the interest of efficiency. Means are also preferably provided for regulating the height of the blowing and receiving conduits so that the apparatus may be adjusted to crops of various heights or at different stages of growth.

The invention will be more readily understood by reference to the accompanying drawings and the following detailed description in which a specific embodiment of the invention is set forth by way of illustration rather than by way of limitation.

In the drawings:

Fig. 3 is a front view of the same with parts broken away and others shown in section;

Fig. 4 is a section on line 4—4 of Fig. 3;

Fig. 5 is a section on the line 5—5 of Fig. 3 showing one of the receiving conduits and a porous bag or other foraminous receptacle for the collected seed; and Fig. 6 is an enlarged detail view with parts shown in section of one of the brushes with which the receiving conduit is equipped.

Figure 2:
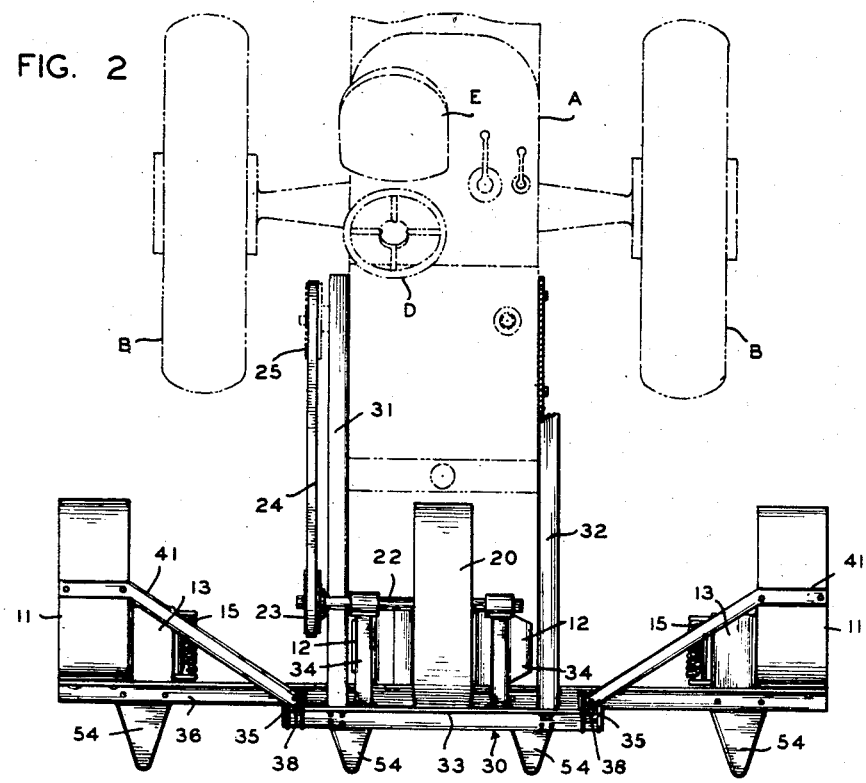
Fig. 2 is a plan view on a reduced scale showing a tractor equipped with a set of threshing elements embodying my invention.
Figure 1:
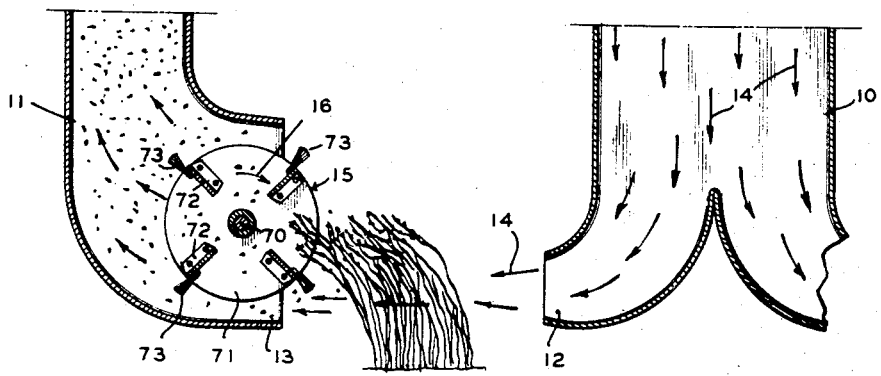
Fig. 1 is a vertical sectional view largely diagrammatic in character showing the relation of the blower nozzle, the receiving conduit and the revolving brush which are shown on a smaller scale in assembled position in Fig. 3 and which constitute the principal elements of the combination.

Referring first particularly to Fig. 1, 10 denotes a downwardly directed blower conduit and the reference numeral 11 denotes a corresponding receiving conduit, both conduits being adapted to be mounted at the front end of a tractor or other suitable carrier vehicle as indicated in Figs. 2 and 3. The blower conduit or nozzle 10 is adapted to direct a powerful air blast from a suitable blower, fan or the like through its mouth or nozzle opening 12 into the lower portion of the mouth 13 of the receiving conduit 11, which mouth portion as shown is considerably larger than the lower nozzle opening 12. The air blast passes from the nozzle opening 12 into the receiving mouth 13 in a direction transverse to the direction of movement of the carrier vehicle, the movement of the air being indicated by the arrows 14.

As shown, a brush 15 having four sets of bristles extending lengthwise of the brush is mounted for rotation about a horizontal axis in the conduit 11 adjacent the mouth portion thereof and is adapted for rotation about an axis extending parallel to the direction of movement of the vehicle. Rotation of the brush is effected solely by the force of the air blast, which, as shown, is directed against the lower portion of the brush below the axis of rotation thereof, thereby causing the brush to rotate in the direction of the arrow 16. The lower portion of the brush in revolving operates close to the wall of the receiving conduit or chute but does not contact the same. The air blast acts to turn the brush and at the same time blows the grass heads occupying the space between the mouth of the blower and nozzle and the mouth of the receiving chute into the chute and thence into the brush, whose bristles brush off the ripe grass seeds which are then carried by the blast through the conduit 11 into a suitable receiving receptacle or bag. As the machine travels forward the grass travels relatively backward across the floor of the receiving conduit or chute and under the brush. The air blast with the assistance of the revolving brush removes the ripe grain, which is carried by the air through the receiving conduit or chute and into the retaining receptacle. No threshing mechanism is required following this operation upon the material collected by the combined action of the blast and the revolving brush, for the conglomerate will be found to consist mostly of ripe grain with very little foreign matter.

In Figs. 2 and 3 a multiple-row form of threshing apparatus is shown applied to a conventional farm tractor which is generally indicated by the reference letter A, the same being provided with tractor wheels B and a front wheel or wheels C, the latter being controlled by a steering wheel D accessible to the operator on a seat E. The form of threshing apparatus illustrated in Figs. 2 and 3 is primarily designed for operation on grass planted in rows and is adapted to operate on two rows at a time, such device including two blowing conduits 10 communicating with a common blower passage 10ᵃ leading from a blower casing 20 in which is mounted a propeller unit or fan 21 mounted on a horizontal shaft 22 having at one end a pulley 23 driven by a belt 24 from a drive pulley 25 with which the tractor is equipped, and which may be driven from the tractor engine in any suitable manner. As shown, the outlets 12 of the centrally located blower conduits 10 are directed outwardly toward the inwardly directed inlets of the receiving conduits 11. It will be understood that any convenient number of sets of threshing units, each including a blower conduit 10 and a receiving conduit 11 together with a revolving brush 15 at the inlet and a suitable receptacle at the outlet of the receiving conduit, may be employed without departing from my invention in its broadest aspects, though it has been found in practice that a set of two threshing units arranged at the front of the tractor is most desirable from the standpoint of efficiency. Such a device, particularly when provided with suitable guides for the blades or stalks of grass is also effective in a field in which the grass to be harvested has been broadcast instead of planted in rows.

As shown, the threshing equipment is carried by a suitable frame, generally designated by the reference numeral 30, and comprising interconnected bars mounted at the front of the tractor together with other supporting members suitably carried by the frame of the tractor. To support the front frame 30 a pair of longitudinally extending side bars or angle irons 31, 32 are shown secured to the sides of the tractor A at any suitable elevation. These extend forwardly beyond the tractor proper, and extending transversely thereof across the projecting ends of the side bars there is provided a transverse frame member or bar 33, herein shown in the form of an angle iron of substantial thickness and strength, which provides a support for the grain threshing apparatus. Projecting upwardly from the bar 33 and supported thereby are a pair of inner vertical bracket members 34, 34 which serve as supports for the ends of the fan shaft 22 previously referred to. To the ends of the supporting bar 33 are adjustably connected a pair of outer vertical frame members 35, 35, to the lower ends of which a second horizontal frame member in the form of an angle iron 36 is secured in any suitable manner. The outer vertical frame members 35, 35 are provided with a plurality of apertures 37 which coact with suitable pins 38 adapted to be inserted through apertures at the ends of the bar 33 to retain the vertical members 35 in any desired adjusted position.

The lower horizontal frame member 36 serves as a support for the receiving conduits 11 of the threshing apparatus, and for this purpose a pair of horizontal slots 39, 39 are provided near the ends of the bar 36, through which bolts 40 may be inserted, which extend through the casing of the receiving conduits. By means of the slots horizontal adjustment of the receiving conduits is facilitated.

If desired brace rods or strips 41 may be provided connecting the tops of the receiving conduit casings with the tops of the vertical frame members 35, 35.

The horizontal frame member 36 in conjunction with the upper frame member 33 provides a support for the conduit 10ᵃ which connects the fan casing 20 with the outwardly directed blower conduits 10. The conduit may be secured to the frame members in any suitable manner, as by welding or the like.

In order to direct the grass being harvested, and particularly the heads thereof, toward the spaces between respective blower conduit outlets and the corresponding receiving conduit inlet suitable inclined guide or gathering members 50 and 51 are provided. As shown, the outer guide or gathering members 50 are secured to the corners of the respective receiving conduits 11, 11 in any suitable manner, as by bolts 100, and may also if desired be secured to the horizontal frame member 36. The inner guide or gathering members 51 are shown as supported from the lower transverse frame member 36 and extend downwardly therefrom to a position slightly below the lower limits of the blower conduits 10.

The guide members 50 and 51 are each provided with inclined surfaces 53 which tend to direct the grass to be harvested and particularly the heads thereof into the spaces between the blower and receiving conduits. The guide or gathering members 50 and 51 are also provided with outwardly directed foot portions 54 which engage the grass stems near the ground and thus exert a bending action which assists in the gathering operation. The foot portions 54 also serve to protect the lower ends of the blower and receiving conduits against injury.

If desired the lower portions of the individual blowing and receiving conduit casings may be made vertically adjustable with reference to the upper portions, to conform to variations in level of the grass heads being harvested. Such individual adjustment may also be necessary in order to insure the proper relation between the blower outlet and the receiving inlet of a particular pair of harvesting units. Simultaneous vertical adjustment of the entire harvesting assembly is insured by raising or lowering the vertical carrier members 35 with respect to the cross bar 33.

Any suitable foraminous or porous receptacle may be provided to retain the seed blown into the receiving conduits 11, 11, while permitting the air to pass through the pores thereof. As shown in Fig. 5 a bag 60 is detachably secured at its mouth portion 61 to the outlet end 62 of each receiving conduit 11. A suitable detachable fastening device, such as a coil spring or the like 101, may be provided to releasably secure the bag mouth to the receiving conduit. A suitable platform (not shown) may be provided to support the weight of the bag and contents as it is being filled. When the bag is filled it is removed from the neck of the receiving conduit and may be replaced by another bag.

Similarly, any suitable revolving brush 15 or equivalent means coacting with the air blast and driven thereby may be provided at the inlet portion of each receiving conduit.

As shown each brush is mounted upon an axle 70, the ends of which are journalled in the side walls of the inlet or mouth portion of its respective receiving conduit. The brush includes a pair of disk like end members 71, 71 between which extend a plurality of radially extending cross bars 72, herein shown as four in number, each of which carries a row of bristles 73. The cross bars 72 provide vanes against which the blast from the propeller nozzle impinges, thereby causing rotation of the brush about its central axis which extends transversely of the casing of the receiving conduit adjacent its mouth portion.

It will be noted from Figs. 4 and 5 that the central portion of the brush 15 between the disks 71 is hollow except for the cross bars 72 and the axle portion, thus allowing the air blast to flow freely through the brush.

The operation of the device will be largely apparent from the foregoing description. As the tractor A with the attached grass seed harvesting or threshing equipment is driven through a field of grass having heads bearing ripe seed the horizontal feet 54 and inwardly inclined vertical side portions 53 of the gathering guides 50 and 51 direct the grass into the spaces 12 and 13 between the mouth portions of the blower and receiving conduits 10 and 11. The high pressure air blast from the fan or blower 21 passes downwardly through the pipe 10ª, then divides and passes laterally from the diverging blower outlets 12 across the intervening passages and into the lower portions of the receiving conduits 11, where it impinges against the cross bars 72 of the brushes 15 below their axes, causing them to rotate in the direction of the arrow 16, causing the rows of bristles to lightly engage the heads of grass which are brought into the path thereof by the combined action of the gathering guides and the air blast. The combined effect of the air blast and the brushes strips the ripe grass seed from the heads, without injuring the green portions thereof, and after removal of the seed from the heads the air blast carries the seed upwardly through the vertical portion of the receiving conduit, then through the rounded neck portion 62 and into the collecting bag or sack, which is sufficiently porous to allow the air to flow freely therethrough while retaining the seed therein. When the bag 60 is filled it may be removed and replaced with another.

The invention has been described in detail for the purpose of illustration, but it will be obvious that numerous modifications and variations may be resorted to without departing from the spirit of the invention.

I claim:

1. An ambulant harvesting machine for selectively removing ripe grass seed from seed heads of growing grass without injury to the green or immature portion, which comprises a carrier vehicle adapted to be drawn through a field of standing grass, a blower conduit and a receiving conduit carried thereby, the blower conduit having a lateral discharge nozzle located near the level of the grass heads, the receiving conduit having an open mouth portion, the lower portion of which is on substantially the same level as the blower nozzle, and a brush mounted for free rotation within the mouth portion of the receiving nozzle about a horizontal axis, said brush having vanes adapted to be driven by the blast from said nozzle, whereby the ripe seed is separated from the seed head and directed through the receiving conduit, the air blast from the blower nozzle being directed principally below the axis of rotation of the brush.

2. A grass seed harvester as set forth in claim 1, wherein the blower and receiving conduits are vertically adjustable.

3. An ambulant harvesting machine for selectively removing ripe grass seed from seed heads of growing grass without injury to the green or immature portion, which comprises a carrier vehicle adapted to be moved through a field of standing grass, a blower conduit and a receiving conduit carried thereby, the blower conduit having a lateral discharge nozzle located near the level of the grass heads, the receiving conduit having a vertically elongated open mouth portion, the lower portion of which is on substantially the same level as the blower nozzle, and a brush mounted free for rotation about a horizontal axis in the mouth portion of the receiving conduit, said brush being driven solely by the blast from said blower nozzle, the air blast from the blower nozzle being principally directed below the axis of rotation of the brush.

4. An ambulant harvesting machine for selectively harvesting ripe grass seed from growing grass without injury to immature portions of the seed head, a foraminous receptacle, a tubular conduit leading to said receptacle and having an inlet mouth portion on a level with the heads of seed to be harvested, a blower having an outlet nozzle disposed to direct an air blast into said inlet mouth portion, and a brush mounted for free rotation about a horizontal axis in the inlet mouth portion, and the air blast from the blower nozzle being principally directed below the axis of rotation of the brush.

5. The machine as defined in claim 3 together with a cross bar rigidly mounted on said vehicle, and a vertically adjustable frame attached to said cross bar, said blower and receiving conduits being mounted on said frame, whereby the operating level of the nozzle of the blower conduit and the mouth portion of the receiving conduit may be vertically adjusted.

6. The machine as defined in claim 5 wherein said receiving conduit is adjustable horizontally on said frame toward and away from said blower conduit, whereby the distance of the mouth portion of the receiving conduit from the nozzle of the blower conduit may be varied.

7. An ambulant grass seed harvesting machine which comprises a carrier vehicle, a blower conduit and a receiving conduit carried by the vehicle, the blower conduit having a lateral discharge nozzle and the receiving conduit having an open mouth portion extending vertically to a greater extent than said nozzle and laterally spaced therefrom, the lower portion of the mouth portion being on substantially the same level as the nozzle, and a brush having vanes and being mounted for free rotation about a horizontal axis in the mouth portion of the receiving conduit substantially midway between the top and bottom thereof, the air blast being principally directed below the axis of rotation of the brush.

8. A grass seed harvesting machine as set forth in claim 7, wherein a plurality of sets of blower and receiving conduits are mounted at the front end of a carrier vehicle.

References Cited in the file of this patent

UNITED STATES PATENTS

| | | |
|---|---|---|
| 1,250,516 | Salter | Dec. 18, 1917 |
| 2,346,270 | Nisbet | Apr. 11, 1944 |
| 2,427,115 | Nisbet | Sept. 9, 1947 |
| 2,484,524 | Nisbet | Oct. 11, 1949 |

FOREIGN PATENTS

| | | |
|---|---|---|
| 338,414 | Great Britain | Nov. 20, 1930 |